United States Patent [19]

Wolfgruber et al.

[11] Patent Number: 5,049,636

[45] Date of Patent: Sep. 17, 1991

[54] ORGANOSOLS OF ORGANOPOLYSILOXANES AND A PROCESS FOR PREPARING THE SAME

[75] Inventors: Matthias Wolfgruber; Bernward Deubzer; Volker Frey, all of Burghausen; Helmut Oswaldbauer, Stubenberg/Fürstberg, all of Fed. Rep. of Germany

[73] Assignee: Wacker-Chemie GmbH, Munich, Fed. Rep. of Germany

[21] Appl. No.: 330,529

[22] Filed: Mar. 30, 1989

[30] Foreign Application Priority Data

Mar. 31, 1988 [DE] Fed. Rep. of Germany ....... 3811155

[51] Int. Cl.$^5$ .............................................. C08G 77/04
[52] U.S. Cl. ........................................ 528/33; 528/10; 528/34
[58] Field of Search ............................ 528/10, 33, 34; 524/837

[56] References Cited

U.S. PATENT DOCUMENTS

| 3,433,780 | 3/1969 | Cekada et al. | 525/477 |
| 4,424,297 | 1/1984 | Bey | 524/714 |
| 4,644,077 | 2/1987 | Gupta | 556/457 |
| 4,806,665 | 2/1989 | Jones et al. | 556/413 |
| 4,814,017 | 3/1989 | Yoldas et al. | 106/287.12 |
| 4,857,582 | 8/1989 | Wolfgruber et al. | 524/730 |

Primary Examiner—John C. Bleutge
Assistant Examiner—R. Dean, Jr.

[57] ABSTRACT

Organosols of organopolysiloxanes are prepared by adding water-soluble organic solvents or mixtures thereof or water-soluble mixtures of water-soluble and water-insoluble organic solvents to aqueous, colloidal suspensions of organopolysiloxanes obtained by adding at least one alkoxysilane and/or the partial hydrolyzate thereof, and, if appropriate, mixed with an organo(-poly)siloxane free of alkoxy groups and having a maximum of 8 siloxane units per molecule, to water in the presence of emulsifiers at a maximum rate of 5 moles of organosilicon compound per hour and per liter of water, and subsequently removing the water by distillation.

32 Claims, No Drawings

ORGANOSOLS OF ORGANOPOLYSILOXANES AND A PROCESS FOR PREPARING THE SAME

The present invention relates to organosols of organopolysiloxanes, particularly to organosols of organopolysiloxanes which are extremely stable and more particularly to a process for preparing extremely stable organosols of organopolysiloxanes.

BACKGROUND OF THE INVENTION

European Patent A-216,047 to Gupta Goutam discloses a process for preparing organosols of organically modified silicas by mixing water and a catalytic amount of an acid with a silica organosol whose organic solvent is water-soluble, adding a trialkoxysilane in increments to the mixture, and then removing all the water.

U.S. Pat. No. 3,433,780 to Cekada et al; U.S. Pat. No. 4,424,297 to Bey; and U.S. patent application Ser. No. 07/195,567, filed May 18, 1988, now U.S. Pat. No. 4,857,582, disclose that the alkanol produced in the process for preparing aqueous colloidal suspensions of organopolysiloxanes can coagulate the colloidal suspensions of organopolysiloxanes, even at low concentrations.

Therefore, it is an object of the present invention to prepare organosols of organopolysiloxanes which have an average particle size of from 10 to 150 nm. Another object of the present invention is to prepare organosols of organopolysiloxanes which are extremely stable and have an organopolysiloxane solids content of from 30 to 50 percent by weight, based on the total weight of the organosol. Still another object of the present invention is to prepare organosols of organopolysiloxanes which are miscible with non-polar organic solvents and polymerizable organic monomers. A further object of the present invention is to provide a process in which the organosols are obtained in a technically simple and inexpensive manner.

SUMMARY OF THE INVENTION

The foregoing objects and others which are apparent from the following description are accomplished in accordance with this invention, generally speaking, by providing organosols of organopolysiloxanes which are obtained by adding water-soluble organic solvents or mixtures thereof or water-soluble mixtures of water-soluble and water-insoluble organic solvents to aqueous colloidal suspensions of organopolysiloxanes that are prepared by adding at least one alkoxysilane and/or the partial hydrolyzate thereof, and, if appropriate, mixed with an organo(poly)siloxane free of alkoxy groups and having a maximum of 8 siloxane units per molecule to water in the presence of emulsifiers at a maximum rate of 5 moles of organosilicon compound per hour and per liter of water, and thereafter the water is removed by distillation.

The invention also relates to a process for preparing organosols of organopolysiloxanes which comprises adding water-soluble organic solvents or mixtures thereof or water-soluble mixtures of water-soluble and water-insoluble organic solvents to aqueous colloidal suspensions of organopolysiloxanes which have been obtained by adding at least one alkoxysilane and/or the partial hydrolyzate thereof and, if appropriate, mixed with an organo(poly)siloxane free of alkoxy groups and having a maximum of 8 siloxane units per molecule to water in the presence of emulsifiers at a maximum rate of 5 mols of organosilicon compound per hour and per liter of water, and thereafter removing the water by distillation.

DESCRIPTION OF THE INVENTION

In U.S. Pat. No. 3,433,780 to Cekada et al and U.S. Pat. No. 4,424,297 to Bey, as well as U.S. patent application Ser. No. 07/195,567, colloidal suspensions of organopolysiloxanes and processes for preparing the same by emulsion polymerizing alkoxysilanes in a water-surfactant mixture are disclosed. These references also disclose that the alkanol produced in the process for preparing the colloidal suspensions of organopolysiloxanes can coagulate these colloidal suspensions even at low concentrations. It was, therefore, surprising that organosols of these organopolysiloxanes can be prepared by adding water-soluble organic solvents or mixtures thereof or water-soluble mixtures of water-soluble and water-insoluble organic solvents to the aqueous, colloidal suspensions of organopolysiloxanes.

The organosols of organopolysiloxanes of this invention comprise aqueous, colloidal suspensions of organopolysiloxanes which are solid at room temperature and have units of the formula

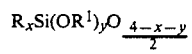

where R which may be the same or different represents a hydrogen atom or a monovalent hydrocarbon radical having from 1 to 8 carbon atoms per radical, and may contain substituents which are inert to water, $R^1$ which may be the same or different represents a hydrogen atom or an alkyl or alkoxyalkylene radical having from 1 to 4 carbon atoms per radical, x is 0, 1, 2 or 3, with an average of from 1.0 to 2.0, and y is 0, 1 or 2, with an average of from 0.0 to 0.5.

In preparing the organosols of organopolysiloxanes of this invention, only those organopolysiloxanes which are solid at room temperature and are insoluble in the organic solvents used are preferably employed.

The aqueous, colloidal suspensions employed for preparing the organosols of organopolysiloxanes of this invention, which are solid at room temperature, have an average particle diameter of from 10 to 150 nm.

The aqueous, colloidal suspensions used in preparing the organosols of organopolysiloxanes of this invention which are solid at room temperature are described in U.S. Pat. No. 3,433,780 and U.S. Pat. No. 4,424,297 and in U.S. patent application Ser. No. 07/195,567, filed May 18, 1988.

In preparing the organosols of organopolysiloxanes of this invention, silanes or mixtures of silanes of the formula

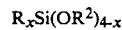

where x and R are the same as above, and $R^2$ is the same or different and represents an alkyl or alkyloxyalkylene radical having from 1 to 4 carbon atoms per radical or a radial of the formula $-COCH_3$, $-COC_2H_5$ or $-CH_2CH_2OH$ are employed.

If only one single type of silane is used, then x is 1.

Preferably, mixtures of at least two different silanes having the above formula, in which x has a different value are used.

Mixtures of silanes of the formula RSi(OR$^2$)$_3$ and R$_2$Si(OR$^2$)$_2$ in which R and R$^2$ are the same as above and where the proportion of R$_2$Si(OR$^2$)$_2$ in the mixture is, at most, 50 mole percent are preferably employed.

In the preparation of the organosols of organopolysiloxanes of this invention, it is also possible to employ partial hydrolyzates of the silanes mentioned above or silane mixtures having not more than 10 Si atoms per partial hydrolyzate.

Of course, those silanes or mixtures of silanes or partial hydrolyzates thereof which result in organopolysiloxanes that are insoluble in the organic solvents used are employed.

In preparing the organosols of organopolysiloxanes of this invention, organo(poly)siloxanes free of alkoxy groups and having a maximum of 8 siloxane units per molecule are mixed with at least one alkoxy silane and/or a partial hydrolyzate thereof. As organo(poly)siloxanes having a maximum of 8 siloxane units per molecule, it is possible to use, for example, linear organo(poly)siloxanes of the formula R$_3$SiO(SiR$_2$O)$_n$SiR$_3$ where R is the same as above, n is 0 or an integer having a value of from 1 to 6, and more preferably n is 0. Hexamethyldisiloxane is a preferred example of such an organopolysiloxane. Examples of organo(poly)siloxanes having a maximum of 8 siloxane units per molecule are cyclic organo(poly)siloxanes of the formula (R$_2$SiO)$_m$ where R is the same as above and m is an integer having a value of from 3 to 8, and more preferably 4. An example of an organo(poly)siloxane mixed with at least one alkoxysilane is a mixture containing hexaorganodisiloxane and tetraalkoxysilane, preferably in a molar ratio of from 1:9 to 1:1. A mixture containing hexamethyldisiloxane and tetraethyl silicate in a molar ratio of from 1:4 to 1:2 is more preferably employed.

Another mixture containing an organo(poly)siloxane and at least one alkoxysilane which may be employed is a cyclic organosiloxane mixed with a trialkoxysilane, and more preferably a tetrameric cyclic organosiloxane mixed with a trialkoxysilane.

Only those mixtures of organo(poly)siloxanes free of alkoxy groups and having a maximum of 8 siloxane units per molecule and alkoxysilanes which result in organopolysiloxanes that are solid at room temperature and are insoluble in the organic solvents used are employed.

Examples of hydrocarbon radicals having SiC-bonded organic radicals, and thus radicals represented by R in the above formulas are alkyl radicals, such as the methyl, ethyl, n-propyl, isopropyl, n-butyl, sec-butyl, amyl, hexyl, β-ethylhexyl and heptyl radicals; alkenyl radicals, such as the vinyl, allyl and butenyl radicals; alkinyl radicals; cycloalkyl radicals, such as the cyclobutyl, cyclohexyl and methylcyclohexyl radicals; aryl radicals, such as the phenyl radical; alkaryl radicals, such as tolyl radicals; and aralkyl radicals, such as the benzyl radical. The methyl, vinyl and phenyl radicals are the preferred radicals.

Examples of substituted hydrocarbon radicals having SiC-bonded organic radicals, and thus radicals represented by R in the above formulas, are halogenated hydrocarbon radicals, such as the chloromethyl, 3-chloropropyl, 3-bromopropyl, 3,3,3-trifluoropropyl and 5,5,5,4,4,3,3-heptafluroropentyl radical, and the chlorophenyl, dichlorophenyl and trifluorotolyl radicals; mercaptoalkyl radicals, such as the 2-mercaptoethyl and 3-mercaptopropyl radicals; cyanoalkyl radicals, such as the 2-cyanoethyl and 3-cyanopropyl radicals; aminoalkyl radicals, such as the 3-aminopropyl, N-(2-aminoethyl)-3-aminopropyl and N-(2-aminoethyl)-3-amino(2-methyl)propyl radicals; aminoaryl radicals, such as the aminophenyl radical; acyloxyalkyl radicals, such as the 3-acryloxypropyl and 3-methacryloxypropyl radicals; hydroxyalkyl radicals, such as the hydroxypropyl radical; and radicals of the formula

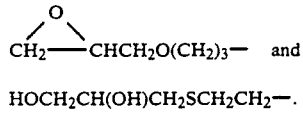
and

HOCH$_2$CH(OH)CH$_2$SCH$_2$CH$_2$—.

Preferably, a maximum of 20 percent of the organic radicals in the organosilicon compound employed are substituted hydrocarbon radicals.

Examples of hydrocarbon radicals represented by R$^1$ are alkyl radicals, such as the methyl, ethyl, n-propyl, isopropyl, n-butyl, sec-butyl and tert-butyl radicals, and alkoxyalkylene radicals, such as the methoxyethylene and ethoxyethylene radicals. The methyl and ethyl radicals are particularly preferred. All examples of hydrocarbon radicals represented by R$^1$ also apply to the hydrocarbon radicals represented by R$^2$.

The emulsifiers used to prepare the organosols of organopolysiloxanes of this invention include carboxylic acids having 9 to 20 carbon atoms, aliphatically substituted benzenesulphonic acids having at least 6 carbon atoms in the aliphatic substituents, aliphatically substituted naphthalene-sulphonic acids having at least 4 carbon atoms in the aliphatic substituents, aliphatic sulphonic acids having at least 6 carbon atoms in the aliphatic substituents, silylalkylsulphonic acids having at least 6 carbon atoms in the alkyl substituents, aliphatically substituted diphenyl ether sulphonic acids having at least 6 carbon atoms in the aliphatic substituents, alkyl hydrogen sulphates having at least 6 carbon atoms in the alkyl substituents, quaternary ammonium halides and quaternary ammonium hydroxides. All the acids mentioned can be used as such, or if appropriate, mixed with their salts.

If anionic emulsifiers are employed, it is advantageous to use those whose aliphatic substituents contain at least 8 and more preferably 12 carbon atoms. Specific examples of aliphatic substituents are octyl, decyl, dodecyl, cetyl, stearyl, myricyl, oleyl, nonenyl, octynyl, phytyl and pentadecadienyl radicals. Aliphatically substituted benzenesulphonic acids are preferred as anionic emulsifiers. If cationic emulsifiers are used, it is advantageous to use halides, and in particular, chlorides and bromides.

The amount of emulsifier is not critical and can be unusually low, because the aqueous colloidal suspension employed in the preparation of the organosols of organopolysiloxanes has an extremely small particle size of from 10 to 150 nm. The emulsifier is preferably used in an amount of from 0.5 to 2.9 percent by weight, and more preferably in an amount of from 1.5 to 2.0 percent by weight, based on the weight of the organosilicons employed in the preparation of the organosols of organopolysiloxanes.

In many applications, however, emulsifiers which can be washed out or are capable of diffusion and accumulate at interfaces have an interfering effect. For this reason, addition salts of acetic acid with 3-aminopropyltrimethoxysilane or 3-aminopropyltriethoxysilane, and especially addition salts of acetic acid with N-(2-aminoethyl)-3-aminopropyltrimethoxysilane or N-(2-aminoethyl)-3-aminopropyltriethoxysilane, which are hydrolyzed and condensed together with the organosilicon compounds to be employed according to this invention and at the same time are also incorporated into the organopolysiloxane structure can be more advantageously used instead of the emulsifiers mentioned above in the preparation of the colloidal suspensions of organopolysiloxanes of this invention.

Preferably, 3-aminopropyltrimethoxysilane or 3-aminopropyltriethoxysilane and N-(2-aminoethyl)-3-aminopropyltrimethoxysilane or N-(2-aminoethyl)-3-aminopropyltriethoxysilane is employed in an amount of from 5 to 20 percent by weight, and acetic acid is preferably employed in an amount of from 4 to 15 percent by weight, based on the weight of the organosilicon compound employed.

In addition, it is also possible to use addition salts of sodium sulphite with 3-glycidoxypropyltrimethoxysilane or 3-glycidoxypropyltriethoxysilane.

The aqueous colloidal suspensions employed in the preparation of the organosols of organopolysiloxanes of this invention, which are solid at room temperature, are preferably prepared by adding the organosilicon compound to water in the presence of an emulsifier at a maximum rate of 5 moles of organosilicon compound per hour and per liter of water, and more preferably from 0.5 to 1.0 mole of organosilicon compound per hour and per liter of water, and subsequently removing the hydrolytically formed alkanol by distillation. The aqueous colloidal suspensions employed in the preparation of the organosols of organopolysiloxanes, which are solid at room temperature, can be prepared in acidic, neutral or alkaline medium. The preparation is preferably carried out at 15° to 90° C., and more preferably at 60° to 85° C., preferably at the pressure of the ambient atmosphere, i.e., at 1020 hPa (abs.), or about 1020 hPa (abs.), or if desired, alternatively at higher or lower pressures.

The process for the preparation of the aqueous, colloidal suspensions of organopolysiloxanes which are solid at room temperature can be carried out batchwise, semicontinuously or continuously. It is preferably carried out as a continuous process.

The colloidal, aqueous suspensions of organopolysiloxanes, which are solid at room temperature, are preferably prepared by the process described in the U.S. patent application, Ser. No. 07/195,567, filed May 18, 1988, in which the organosilicon compounds, water, and at least one of the two substances containing emulsifier, are fed continuously and separately into a reactor. The reactor can be a tubular reactor, a stirred kettle, a kettle cascade, a circulating reactor, a tray-like reactor or other customary reactors. The reactor is optionally provided with a means for warming or cooling the reactor contents. A tubular reactor in which the water is added continuously at the beginning of the tubular reactor and the organosilicon compound is added continuously via several feed points arranged along the longitudinal axis of the tubular reactor is preferably employed. After a residence time in the reactor which is sufficient to hydrolyze and condense the organosilicon compound employed, the aqueous suspension emerges continuously from the reactor. The residence time is at least 5 minutes, preferably 30 to 60 minutes. The alkanol formed during the hydrolysis is continuously distilled off from the aqueous suspension emerging from the reactor. The alkanol is preferably removed by distillation. Thin-film evaporators, for example, are suitable for this purpose. In order to increase the content of solid organopolysiloxane, the aqueous suspension is continuously fed back into the reactor, where the organosilicon compound, and if appropriate, emulsifier are again fed continuously to the reactor. The aqueous suspension can optionally be circulated several times until the desired content of solid organopolysiloxane is attained. Part of the aqueous suspension produced having the desired content of solid organopolysiloxane is then removed continuously, and the remainder is fed back continuously into the reactor and again mixed continuously with water, organosilicon compound and emulsifier.

The aqueous colloidal suspensions employed in the preparation of the organosols of organopolysiloxanes according to this invention, which are solid at room temperature, preferably have a solid content of up to 20 percent by weight, based on the total weight of the suspension.

In the preparation of the organosols of organopolysiloxanes according to this invention, the water-soluble organic solvents preferably employed are lower alkanols, such as methanol, ethanol, n-propanol, i-propanol and n-butanol, alkoxyalkanols, such as methoxyethanol, ethoxyethanol and propoxyethanol, ethylene glycols having 1 to 6 ethoxy units, acetone and tetrahydrofuran.

In preparing the organosols of organopolysiloxanes according to this invention, the water-soluble organic solvents employed may be liquid at room temperature or solid at room temperature such as polyethylene glycols and block copolymers of polyethylene glycols and polypropylene glycols having a high moiety of polyethylene glycols.

In the preparation of the organosols of organopolysiloxanes according to this invention, the water-immiscible organic solvents employed are preferably cyclohexanone, methyl isobutyl ketone and methacrylic acid esters. Water-immiscible organic solvents are only employed when mixed with water-soluble solvents, such as lower alkanols.

In preparing the organosols of organopolysiloxanes according to this invention, the water-insoluble organic solvents employed are preferably higher alkanols having from 8 to 18 carbon atoms, polypropylene glycols which are solid at room temperature and alkylacetates having from $C_6$- to $C_{13}$-alkyl radicals which are solid at room temperature. Also, these water-insoluble organic solvents are only employed when mixed with water-soluble solvents, such as lower alkanols.

Water-soluble organic solvents or mixtures thereof or water-soluble mixtures of water-soluble and water-insoluble solvents are added during the preparation of the organosols of organopolysiloxanes according to this invention in amounts which are at least necessary for the preparation of a completely clear organosol. These organic solvents are, therefore, preferably employed in amounts of at least 50 percent by weight, and more preferably in amounts of from 100 to 300 percent by weight, based on the total weight of the aqueous, colloidal suspension of organopolysiloxanes employed.

The solvents mentioned above, or solvent mixtures, are preferably added in one portion and as fast as possible to the aqueous, colloidal suspensions of organopolysiloxanes in the process of this invention. When acetone, tetrahydrofuran or lower alkanols are added, a reversible coagulation, i.e., turbidity or a precipitate, is observed at the beginning of the operation; however, further addition of solvent results in a clear organosol.

Concentrated and anhydrous organosols of organopolysiloxanes are preferably obtained by removing the water by distillation at 50° to 90° C. and at 1 to 1000 hPa (abs.) after the addition of the solvents or solvent mixtures mentioned above to the aqueous, colloidal suspensions of organopoly-siloxanes. In general, binary and ternary azeotropes distill off during this operation. If turbidity occurs in the organosol during the distillation, this is eliminated by adding lower alkanols.

Organosols of organopolysiloxanes in aprotic solvents, such as, for example, cyclohexanone, can be obtained through subsequent distillation, since water can be distilled off as a ternary azeotrope with ethanol and cyclohexanone from a previously added water-soluble mixture of, for example, cyclohexanone and ethanol. In a water-soluble mixture of this type containing water-soluble and water-insoluble organic solvents, the water-soluble organic solvent is, therefore, preferably present at the most in an amount which is necessary for complete removal of the water as a ternary azeotrope during the distillation. Water-soluble organic solvents or mixtures thereof or water-soluble mixtures of water-soluble and water-insoluble organic solvents are preferably added in an amount such that, after complete removal of the water as an azeotrope, organosols of organopolysiloxane having a solids content of preferably from 30 to 50 percent by weight, based on the total weight of the organosol are obtained.

The organosols of organopolysiloxanes of this invention are extremely stable. Thus, they can be stored for several weeks both at 50° C. and at 70° C., subjected to repeated freezing and thawing cycles and centrifuged at 5000 rpm without any change. Conversion of the aqueous, colloidal suspensions of organopolysiloxanes into organosols of organopolysiloxanes is associated only with an unimportant change in the particle diameter of the organopolysiloxanes, if any at all. Thus, organosols of organopolysiloxanes having a particle diameter of from 10 to 150 nm are preferentially obtained. The organosols of this invention also resemble their aqueous analogues with respect to their outward appearance, such as opalescence, but naturally have a greatly reduced surface tension compared with the aqueous, colloidal suspensions. In contrast to the aqueous, colloidal suspensions of organopolysiloxanes having a maximum organopolysiloxane solids content of 20 percent by weight, based on the total weight of the suspension, the organosols of organopolysiloxanes of this invention have a clearly higher organopolysiloxane solids content of, preferably, from 30 to 50 percent by weight. The organosols of organopolysiloxanes of this invention, such as for example, butanolsols or cyclohexanonesols, are readily miscible in nonpolar organic solvents, such as toluene or hexane, or in polymerizable monomers, such as methyl methacrylate.

The organopolysiloxanes of this invention can be incorporated into silicone polymers and into other duroplastic or thermoplastic organic polymers. They can be used in place of highly dispersed silica which has been rendered hydrophobic. In contrast to the use of powders, no agglomeration or aggregation occurs on incorporation, which means that the large surface areas of organopolysiloxanes in the organosol and all the associated properties can be fully utilized.

PREPARATION OF THE AQUEOUS, COLLOIDAL SUSPENSIONS OF ORGANOPOLYSILOXANES (A) TO (E)

I. Suspensions (A) to (C)

About 3 liters of water and in each case the emulsifier shown in Table 1(a) are introduced into a 5 liter three-neck flask equipped with stirrer, dropping funnel, thermometer and distillation attachment, and the mixture is warmed to 65° C. The organosilicon compound from Table 1(a) is metered over a period of 5 hours at 65° C. and 300 hPa (abs.) with stirring via a capillary dipping into the flask. At the same time, the methanol formed on hydrolysis is distilled off, the pressure being regulated in a manner such that the volume of the contents in the flask remains constant during the addition of silane. When the addition of silane is complete, the mixture is stirred continuously for an additional one-half hour at 65° C. and 300 hPa (abs.). The aqueous suspensions (A) to (C) can then be filtered, if necessary, through a nylon net.

Aqueous suspensions of organopolysiloxanes (A) to (C) are obtained having the values shown in Table 1(a) for the average particle diameter, determined by electron microscopy, the viscosities and the solid organopolysiloxane content.

II. Suspensions (D) and (E)

In each case, 4 liters per hour of a water/emulsifier mixture containing 24 g of dodecylbenzenesulphonic acid per 4 liters of water are fed continuously with the aid of a hose pump, into a tubular reactor having a capacity of 4 liters and an internal diameter of 3 cm, the reactor contents in each case being kept at the temperature shown in Table 1(b). In each case, 400 ml per hour of the organosilicon compound from Table 1(b) are added continuously to the water/emulsifier mixture with the aid of metering pumps via five different feed points arranged along the longitudinal axis of the reactor in the first third of the tubular reactor. The reaction mixture emerging from the tubular reactor is passed continuously to a thin-film evaporator. In the thin-film evaporator, 400 ml per hour of a methanol/water mixture are distilled off continuously. The temperature and circulation rate of the thin-film evaporator is in each case selected such that the same volume is in each case distilled off per unit time as organosilicon compound is introduced. After the distillation, the aqueous suspension is returned continuously into the tubular reactor and then recharged with the organosilicon compound. After four passes, 1 liter per hour of the colloidal suspension is removed continuously, 3 liters per hour of the colloidal aqueous suspension are fed back continuously into the tubular reactor and 1 liter per hour of fresh water/emulsifier mixture is added continuously. At the same time, the organosilicon compound from Table 1(b) is in each case metered in continuously at a constant volume flow of 400 ml per hour via the five feed points described above. Aqueous suspensions of organopolysiloxanes (D) and (E) are obtained having the values given in Table 1(b) for the average particle diameters, determined by electron microscopy, the viscosities and the solid organopolysiloxane content.

TABLE 1a

| | Organosilicon Compound | Emulsifier | Solids Content[2] [% by wt.] | Viscosity [mPa.s at 25° C.] | d[3] [nm] |
|---|---|---|---|---|---|
| (A) | 1175 g of methyltrimethoxysilane | 3.5 g of dodecylbenzene sulphonic acid<br>13.5 g of sodium dodecylbenzene sulphonate | 19 | 6.6 | 15 |
| (B) | 917 g of methyltrimethoxysilane<br>88 g of methacryloxypropyltrimethoxysilane (95:5)[1] | 3.5 g of dodecylbenzene sulphonic acid<br>13.5 g of sodium dodecylbenzenesulphonate | 17 | 5.4 | 23 |
| (C) | 603 g of phenyltrimethoxysilane<br>204 g of methyltrimethoxysilane (7:3)[1] | 12.5 g of dodecylbenzene sulphonic acid | 18 | 7.8 | 33 |

[1]Molar ratio.
[2]Content of solid organopolysiloxane in the suspension in percent by weight, based on the total weight of the suspension.
[3]Average particle diameter determined by electron microscopy.

TABLE 1b

| Organosilicon Compound (400 ml of mixture) | T (°C.)+ | Solids content[2] (% by weight) | Viscosity (mPa.s at 25° C.) | d[3] (nm) |
|---|---|---|---|---|
| (D) 276.5 g of methyltrimethoxysilane<br>105 g of dimethyldimethoxysilane (7:3)[1] | 65 | 20 | 8.7 | 37 |
| (E) 65.3 g of hexamethyldisiloxane<br>336 g of tetraethylsilcate (1:4)[1] | 85 | 18 | 9.3 | 122 |

[1]Molar ratio.
[2]Content of solid organopolysiloxane in the suspension in percent by weight, based on the total weight of the suspension.
[3]Average particle diameter determined by electron microscopy.
+Temperature in the tubular reactor.

In the following examples, all parts and percentages are by weight, unless otherwise specified.

EXAMPLE 1

About 1.0 part of suspension (A), whose preparation is described above, is mixed with 1.0 part of ethanol and 0.85 parts of n-butanol to form a clear aqua-/organosol. The water is removed by distillation (as an azeotrope) at 60° C. and 50 hPa (abs.). The distillation is terminated when the solids content of the organopolysiloxane is 45 percent by weight, based on the total weight of the organosol. An opalescent organosol is obtained having an average particle diameter, determined by electron microscopy, of 23 nm and a viscosity of 48 mPa.s at 25° C. The organosol exhibits a slightly thixotropic behavior.

EXAMPLE 2

About 1.0 part of suspension (A), whose preparation is described above, is mixed with 1.0 part of ethanol and 0.85 parts of cyclohexanone to form a clear aqua-/organosol. The water is removed by distillation (as a ternary azeotrope) at 60° C. and 20 hPa (abs.). The turbidity occurring in the aqua-/organosol is eliminated by introducing a total of 0.2 parts of ethanol by suction. The distillation is terminated when the solids content of the organopolysiloxane is 40 percent by weight, based on the total weight of the organosol. A yellowish organosol having an average particle diameter, determined by electron microscopy, of 26 nm and a viscosity of 34 mPa.s at 25° C. is obtained.

EXAMPLE 3

About 1.0 part of suspension (A), whose preparation is described above, is mixed with 1.4 parts of ethanol and 0.85 parts of butyl acrylate to form a clear aqua-/organosol. The water is removed by distillation (as an azeotrope) at 60° C. and 100 hPa (abs.). The turbidity occurring in the aqua-/organosol is eliminated by introducing a total of 0.2 parts of ethanol by suction. The distillation is terminated when the solids content of the organopolysiloxane is 50 percent by weight, based on the total weight or the organosol. An opalescent organosol having an average particle diameter, determined by electron microscopy, of 29 nm and a viscosity of 57 mPa.s at 25° C. is obtained.

EXAMPLE 4

About 1.0 part of suspension (B), whose preparation is described above, is mixed with 1.5 parts of ethanol and 0.85 parts of butyl acrylate to form a clear aqua-/organosol. The water is removed by distillation (as an azeotrope) at 60° C. and 50 hPa (abs.). The distillation is terminated when the solids content of the organopolysiloxane is 40 percent by weight, based on the total weight of the organosol. An opalescent organosol having an average particle diameter, determined by electron miscroscopy, of 27 nm and a viscosity of 38 mPa.s at 25° C. is obtained.

EXAMPLE 5

About 1.0 part of suspension (C), whose preparation is described above, is mixed with 0.8 parts of ethanol and 1.0 part of butanol to form a clear aqua-/organosol. The water is removed by distillation (as an azeotrope) at 60° C. and 50 hPa (abs.). The distillation is terminated when the solids content of the organopolysiloxane is 40 percent by weight, based on the total weight of the organosol. An opaque organosol having an average particle diameter, determined by electron microscopy, of 39 nm and a viscosity of 42 mPa.s at 25° C. is obtained.

EXAMPLE 6

About 1.0 part of suspension (D), whose preparation is described above, is mixed with 1.25 parts of ethanol and 1.0 part of cyclohexanone to form a clear aqua-/organosol. The water is removed by distillation (as an azeotrope) at 60° C. and 100 hPa (abs.). The distillation is terminated when the solids content of the organopolysiloxane is 30 percent by weight, based on the total weight of organosol. An organosol having an average particle diameter, determined by electron microscopy, of 39 nm and a viscosity of 24 mPa.s at 25° C. is obtained.

EXAMPLE 7

About 1.0 part of suspension (E), whose preparation is described above, is mixed with 1.25 parts of ethanol and 1.0 part of cyclohexanone to form a clear aqua-/organosol. The water is removed by distillation (as an azeotrope) at 60° C. and 100 hPa (abs.). The distillation is terminated when the solids content of the organopolysiloxane is 30 percent by weight, based on the total weight of the organosol. An organosol having an average particle diameter, determined by electron microscopy, of 136 nm and a viscosity of 31 mPa.s at 25° C. is obtained.

All the organosols prepared in accordance with Examples 1 to 7 are extremely stable compared with the aqueous suspensions (A) to (E). Thus, no changes are observed in the organosols after storage for several weeks at 50° C., after repeated freezing and thawing cycles and after centrifuging at 5000 rpm. All the organosols prepared according to Examples 1 to 7 are miscible with other organic solvents, such as toluene or hexane, or with polymerizable monomers, such as methyl methacrylate.

EXAMPLE 8

About 1.0 part of suspension (A), whose preparation is described above, are mixed with 2.0 parts of ethanol and 0.4 parts of hexadecanol-1 to form a clear aqua-/organosol. The water-ethanol-mixture is removed by distillation at 60° C. and 50 hPa (abs.). The turbidity occurring in the aqua-/organosol is eliminated by introducing a total of 0.4 parts of ethanol by suction. A product which is solid at room temperature and melts at 48° C. to form a bluish transparent organosol having an average particle diameter, determined by electron microscopy, of 22 nm and an organopolysiloxane solids content of 33 percent by weight is obtained.

EXAMPLE 9

About 0.3 parts of polyethylene glycol 6000 (average molecular weight 600 g/Mol, melting point 62° C.) are dissolved in 1.0 part of suspension (A), whose preparation is described above, to form a clear aqua-/organosol. The water is then removed by distillation at 75° C. and 20 hPa (abs.). A product which is solid at room temperature and melts at 58° C. to form an opaque organosol having an average particle diameter, determined by electron microscopy, of 18 nm and an organopolysiloxane solids content of 40 percent by weight is obtained.

What is claimed is:

1. Organosols of organopolysiloxanes are prepared by adding water-soluble organic solvents or mixtures thereof or water-soluble mixtures of water-soluble and water-insoluble organic solvents to aqueous colloidal suspensions of organopolysiloxanes which have been obtained by adding an organosilicon compound selected from the group consisting of an alkoxysilane, partial hydrolyzates thereof and mixtures thereof to water in the presence of emulsifiers at a maximum rate of 5 moles of organosilicon compound per hour per liter of water, and thereafter the water is removed by distillation.

2. The organosols of claim 1, wherein the aqueous colloidal suspensions of organopolysiloxanes are obtained by adding an organo(poly)siloxane free of alkoxy groups which has a maximum of 8 siloxane units per molecule to the organosilicon compound.

3. The organosols of claim 1, wherein the aqueous colloidal suspensions of organopolysiloxanes which are solid at room temperature have units of the formula $$R_x Si(OR^1)_y O_{\frac{4-x-y}{2}},$$

in which R is selected from the group consisting of a hydrogen atom, a monovalent hydrocarbon radical having from 1 to 8 carbon atoms per radical, and a substituted monovalent hydrocarbon radical in which the substituent is inert to water, $R^1$ is selected from the group consisting of a hydrogen atom, an alkyl radical and an alkoxyalkylene radical having 1 to 4 carbon atoms per radical, with the proviso that the organopolysiloxanes are insoluble in the organic solvents, x is 0, 1, 2 or 3, with an average of from 1.0 to 2.0, and y is 0, 1 or 2, with an average of from 0.0 to 0.5.

4. The organosols of claim 2, wherein the aqueous colloidal suspensions of organopolysiloxanes which are solid at room temperature have units of the formula $$R_x Si(OR^1)_y O_{\frac{4-x-y}{2}},$$

in which R is selected from the group consisting of a hydrogen atom, a monovalent hydrocarbon radical having from 1 to 8 carbon atoms per radical, and a substituted monovalent hydrocarbon radical in which the substituent is inert to water, $R^1$ is selected from the group consisting of a hydrogen atom, an alkyl radical and an alkoxyalkylene radical having 1 to 4 carbon atoms per radical, with the proviso that the organopolysiloxanes are insoluble in the organic solvents, x is 0, 1, 2 or 3, with an average of from 1.0 to 2.0, and y is 0, 1 or 2, with an average of from 0.0 to 0.5.

5. The organosols of claim 1, wherein the water-soluble organic solvents or mixtures thereof or water-soluble mixtures of water-soluble and water-insoluble organic solvents are added in an amount of at least 50 percent by weight, based on the total weight of the colloidal aqueous suspension of organopolysiloxanes.

6. The organosols of claim 2, wherein the water-soluble organic solvents or mixtures thereof or water-soluble mixtures of water-soluble and water-insoluble organic solvents are added in an amount of at least 50 percent by weight, based on the total weight of the colloidal aqueous suspension of organopolysiloxanes.

7. The organosols of claim 1, wherein the water-soluble organic solvents are selected from the group consisting of lower alkanols, alkoxyalkanols, ethylene glycols having 1 to 6 ethoxy units, acetone and tetrahydrofuran.

8. The organosols of claim 2, wherein the water-soluble organic solvents are selected from the group consisting of lower alkanols, alkoxyalkanols, ethylene glycols having 1 to 6 ethoxy units, acetone and tetrahydrofuran.

9. The organosols of claim 3, wherein the water-soluble organic solvents are selected from the group consisting of lower alkanols, alkoxyalkanols, ethylene glycols having 1 to 6 ethoxy units, acetone and tetrahydrofuran.

10. The organosols of claim 4, wherein the water-soluble organic solvents are selected from the group consisting of lower alkanols, alkoxyalkanols, ethylene glycols having 1 to 6 ethoxy units, acetone and tetrahydrofuran.

11. The organosols of claim 1, wherein the water-soluble organic solvents are selected from the group consisting of polyethylene glycols which are liquid or solid at room temperature and block copolymers which are solid at room temperature consisting of polyethylene glycols and polypropylene glycols having a high content of polyoxyethylene units.

12. The organosols of claim 2, wherein the water-soluble organic solvents are selected from the group consisting of polyethylene glycols which are liquid or solid at room temperature and block copolymers which are solid at room temperature consisting of polyethylene glycols and polypropylene glycols having a high content of polyoxyethylene units.

13. The organosols of claim 3, wherein the water-soluble organic solvents are selected from the group consisting of polyethylene glycols which are liquid or solid at room temperature and block copolymers which are solid at room temperature consisting of polyethylene glycols and polypropylene glycols having a high content of polyoxyethylene units.

14. The organosols of claim 4, wherein the water-soluble organic solvents are selected from the group consisting of polyethylene glycols which are liquid or solid at room temperature and block copolymers which are solid at room temperature consisting of polyethylene glycols and polypropylene glycols having a high content of polyoxyethylene units.

15. The organosols of claim 5, wherein the water-soluble organic solvents are selected from the group consisting of polyethylene glycols which are liquid or solid at room temperature and block copolymers which are solid at room temperature consisting of polyethylene glycols and polypropylene glycols having a high content of polyoxyethylene units.

16. The organosols of claim 6, wherein the water-soluble organic solvents are selected from the group consisting of polyethylene glycols which are liquid or solid at room temperature and block copolymers which are solid at room temperature consisting of polyethylene glycols and polypropylene glycols having a high content of polyoxyethylene units.

17. The organosols of claim 1, wherein water-insoluble organic solvents are used which are selected from the group consisting of cyclohexanone, methyl isobutyl ketone and methacrylic acid esters.

18. The organosols of claim 2, wherein water-insoluble organic solvents are used which are selected from the group consisting of cyclohexanone, methyl isobutyl ketone and methacrylic acid esters.

19. The organosols of claim 1, wherein water-insoluble organic solvents are used which are selected from the group consisting of higher alkanols having from 8 to 18 carbon atoms, polypropylene glycols which are solid at room temperature and alkylacetates having from $C_6$- to $C_{13}$-alkyl radicals which are solid at room temperature.

20. The organosols of claim 2, wherein water-insoluble organic solvents are used which are selected from the group consisting of higher alkanols having from 8 to 18 carbon atoms, polypropylene glycols which are solid at room temperature and alkylacetates having from $C_6$- to $C_{13}$-alkyl radicals which are solid at room temperature.

21. A process for preparing organosols of organopolysiloxanes which comprises adding water-soluble organic solvents or mixtures thereof or water-soluble mixtures of water-soluble and water-insoluble organic solvents to aqueous colloidal suspensions of organopolysiloxanes, in which the organopolysiloxanes are solid at room temperature and thereafter removing the water by distillation, in which the aqueous colloidal suspensions of organopolysiloxanes are obtained by adding an organosilicon compound selected from the group consisting of an alkoxysilane, partial hydrolyzates thereof and mixtures thereof to water in the presence of emulsifiers at a maximum rate of 5 mols or organosilicon compound per hour per liter of water.

22. The process of claim 21, wherein an organo(poly)siloxane free of alkoxy groups which has a maximum of 8 siloxane units per molecule is added to the organosilicon compound.

23. The process of claim 21, wherein the water-soluble organic solvents or mixtures thereof or water-soluble mixtures of water-soluble and water-insoluble organic solvents are added in an amount of at least 50 percent by weight, based on the total weight of the colloidal aqueous suspension of organopolysiloxanes.

24. The process of claim 22, wherein the water-soluble organic solvents or mixtures thereof or water-soluble mixtures of water-soluble and water-insoluble organic solvents are added in an amount of at least 50 percent by weight, based on the total weight of the colloidal aqueous suspension of organopolysiloxanes.

25. The process of claim 21, wherein the water-soluble organic solvents are selected from the group consisting of lower alkanols, alkoxyalkanols, ethylene glycols having 1 to 6 ethoxy units, acetone and tetrahydrofuran.

26. The process of claim 22, wherein the water-soluble organic solvents are selected from the group consisting of lower alkanols, alkoxyalkanols, ethylene glycols having 1 to 6 ethoxy units, acetone and tetrahydrofuran.

27. The process of claim 21, wherein the water-soluble organic solvents are selected from the group consisting of polyethylene glycols which are liquid or solid at room temperature and block copolymers which are solid at room temperature consisting of polyethylene glycols and polypropylene glycols having a high content of polyoxyethylene units.

28. The process of claim 22, wherein the water-soluble organic solvents are selected from the group consisting of polyethylene glycols which are liquid or solid at room temperature and block copolymers which are solid at room temperature consisting of polyethylene glycols and polypropylene glycols having a high content of polyoxyethylene units.

29. The process of claim 21, wherein water-insoluble organic solvents are used which are selected from the group consisting of cyclohexane, methyl isobutyl ketone and methacrylic acid esters.

30. The process of claim 22, wherein water-insoluble organic solvents are used which are selected from the group consisting of cyclohexane, methyl isobutyl ketone and methacrylic acid esters.

31. The process of claim 21, wherein water-insoluble organic solvents are used which are selected from the group consisting of higher alkanols having from 8 to 18 carbon atoms, polypropylene glycols which are solid at room temperature and alkylacetates having from $C_6$- to $C_{13}$-alkyl radicals which are solid at room temperature.

32. The process of claim 22, wherein water-insoluble organic solvents are used which are selected from the group consisting of higher alkanols having from 8 to 18 carbon atoms, polypropylene glycols which are solid at room temperature and alkylacetates having from $C_6$- to $C_{13}$-alkyl radicals which are solid at room temperature.

* * * * *